(12) United States Patent
Huotari et al.

(10) Patent No.: US 8,146,981 B2
(45) Date of Patent: Apr. 3, 2012

(54) CABLE ROLL UP TONNEAU

(75) Inventors: Keijo J. Huotari, Fenton, MI (US);
Stephen J. Lewis, Harrison Township, MI (US); Eric Hanson, Dearborn, MI (US)

(73) Assignee: Magna International Inc., Aurora (CA)

( * ) Notice: Subject to any disclaimer, the term of this patent is extended or adjusted under 35 U.S.C. 154(b) by 0 days.

(21) Appl. No.: 12/804,730

(22) Filed: Jul. 28, 2010

(65) Prior Publication Data
US 2012/0025560 A1   Feb. 2, 2012

(51) Int. Cl.
*B60P 7/04* (2006.01)
(52) U.S. Cl. .............. 296/100.15; 296/100.18
(58) Field of Classification Search ............. 296/100.16, 296/100.18, 100.15
See application file for complete search history.

(56) References Cited

U.S. PATENT DOCUMENTS

| 5,050,924 | A | * | 9/1991 | Hansen | 296/100.15 |
| 5,620,040 | A | * | 4/1997 | Swanner | 160/354 |
| 6,234,561 | B1 |   | 5/2001 | Huotari |  |
| 6,322,129 | B2 |   | 11/2001 | Huotari |  |
| 7,229,121 | B2 | * | 6/2007 | Fox et al. | 296/100.16 |

* cited by examiner

*Primary Examiner* — Dennis Pedder
(74) *Attorney, Agent, or Firm* — Warn Partners, P.C.

(57) ABSTRACT

The present invention is directed to a tonneau cover incorporating a cable system which generates the proper amount of cross-car tension, and still provides for the tonneau cover to be rolled up and stowed when not in use. The present invention is directed to a tonneau cover for a vehicle that is moveable between a stowed position and a deployed position. The tonneau cover has at least one pocket extending along a side of the tonneau cover, and at least one cable disposed in the pocket such that a first end of the cable extends out of a first end of the pocket, and a second end of the cable extends out of a second end of the pocket such that when the tonneau cover is in the deployed position, the cable applies tension to the tonneau cover.

13 Claims, 9 Drawing Sheets

CABLE ROLL UP TONNEAU

FIELD OF THE INVENTION

The present invention relates to a tonneau cover used for the bed of a pickup truck that is moveable between a stowed position and a deployed position, and incorporates a cable along the side of the tonneau cover to maintain proper tension when the tonneau cover is in the deployed position.

BACKGROUND OF THE INVENTION

Tonneau covers are a generally known device for covering the bed portion of a pickup truck. There are many different types of tonneau covers, some of which are a solid fiberglass panel which covers the entire bed of the pickup truck, and others are made of a foldable material which folds and is easily stowed away when not in use. The use of a tonneau cover may be to protect the various components inside the bed of the pickup truck from the surrounding environment, or provide an aesthetically pleasing appearance.

One particular type of tonneau cover, as mentioned above, is what is referred to as a "soft" tonneau cover made of a foldable material which facilitates ease of stowage. A soft tonneau cover typically is connected to a series of rails connected to the sides, tailgate, and front of the bed, respectively. One of the common ways to connect the tonneau cover to the rails along the sides of the bed, or side rails, is through a typical Velcro connection. A typical Velcro connection consists of two layers, a first layer having a series of hooks, and a second layer having a plurality of smaller loops. The hook layer may be disposed on the rail, and the loop layer may be disposed on the cover, or vice versa. Both layers of the Velcro connection typically extend along the length of the side rails. The use of a Velcro connection in prior art tonneau covers is considered desirable because the tonneau cover is easily removable from the side rails, allowing ease of access to the bed of the pickup truck, and allowing the cover to be rolled up and stowed at the front of the bed when not in use.

The Velcro connection also provides for the tonneau cover to be adjustable relative to the side rails. During installation, the Velcro connection may be adjusted to compensate for the tonneau cover becoming stretched over time. The cover is simply pulled tighter, and the Velcro connection is adjusted accordingly. However, during the life of the tonneau cover, dirt and other debris accumulate on the both the hook layer and the loop layer, reducing their effectiveness, thereby reducing the ability for the Velcro connection to maintain proper tension in the tonneau cover.

Accordingly, there exists a need for a tonneau cover which is able to be tensioned properly, and maintain the proper amount of tension over time, yet still have the functionality to be rolled up and stowed when needed.

SUMMARY OF THE INVENTION

The present invention is directed to a tonneau cover incorporating a cable system which generates the proper amount of cross-car tension, and still provides for the tonneau cover to be rolled up and stowed when not in use.

The present invention is directed to a tonneau cover for a vehicle that is moveable between a stowed position and a deployed position. The tonneau cover has at least one pocket extending along a side of the tonneau cover, and at least one cable disposed in the pocket where a first end of the cable extends out of a first end of the pocket, and a second end of the cable extends out of a second end of the pocket such that when the tonneau cover is in the deployed position, the cable applies tension to the tonneau cover.

The present invention also includes a front rail connected to a set of side rails, and a rear rail that is connected to the side rails when the tonneau cover is in the deployed position. The tonneau cover is permanently connected to the front and rear rails. The rear rail includes at least one channel which receives a spring, and the spring is connected to the cable such that as the tonneau cover is placed in the deployed position, the spring applies tension to the cable, thereby applying tension to the tonneau cover, and achieving the proper amount of cross-car tension in the tonneau cover.

It is an object of this invention to provide a tonneau cover having a cable tensioning system which provides cross car tension when the tonneau cover is in the installed or deployed position. It is another object of this invention to provide a cable tensioning system which requires no secondary tensioning from the operator during the installation process. The cable system of the present invention automatically provides the proper tensioning of the cover when the tonneau cover is in a deployed position.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
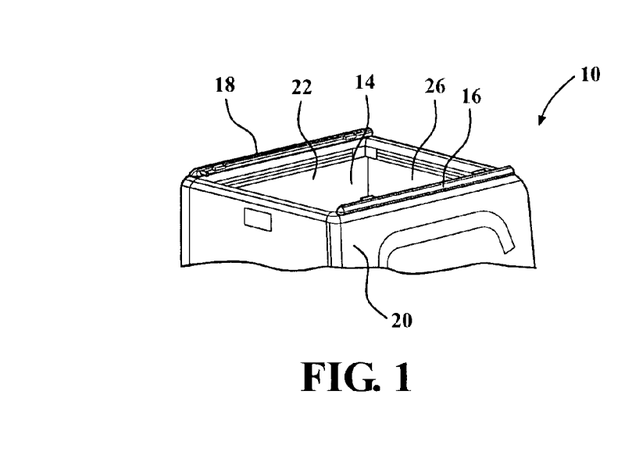
FIG. 1 is a perspective view of a first side rail and a second side rail connected to the bed of a truck used for a tonneau cover, according to the present invention.

A truck bed incorporating a tonneau cover according to the present invention is shown in FIG. 1 generally at 10. Referring to the Figures generally, the tonneau cover 12 according to the present invention is attached to the truck bed 14 through the use of a first side rail 16 and a second side rail 18. More specifically, the first side rail 16 is mounted on a first side wall 20 which is part of the bed 14, and the second side rail 18 is mounted on a second side wall 22 which is also part of the bed 14.

The tonneau cover 12 is selectively connected to each of the side rails 16,18, and is permanently connected to a front rail 24. During the installation of the tonneau cover 12 onto the truck bed 14, the front rail 24 is connected to each of the side rails 16,18 such that the front rail 24 extends along a front wall 26 of the bed 14. Each of the side rails 16,18 has a front connector 28 which is used to connect the side rails 16,18 to the front rail 24.

Figure 2:
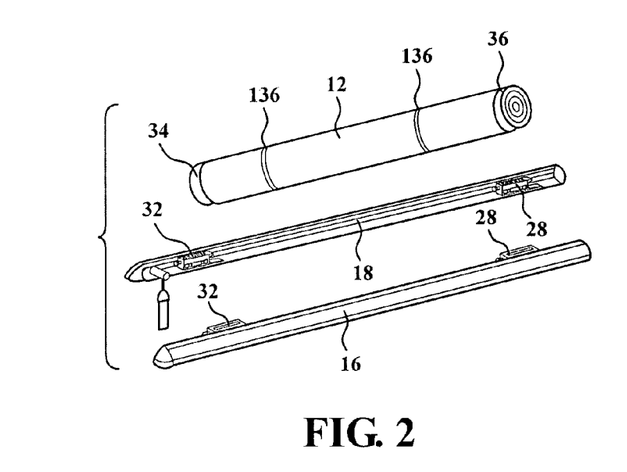
FIG. 2 is an exploded view of a tonneau cover, a first side rail, and a second side rail, according to the present invention.
Figure 3:
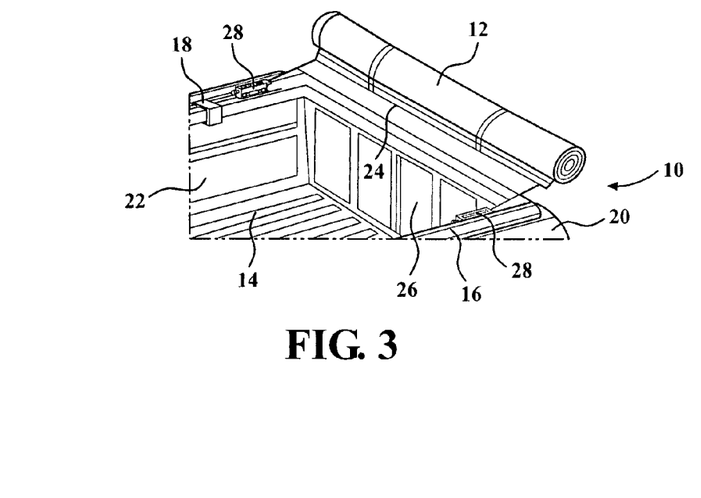
FIG. 3 is an exploded view of a tonneau cover in a stowed position and the truck bed of a vehicle, according to the present invention.
Figure 6:
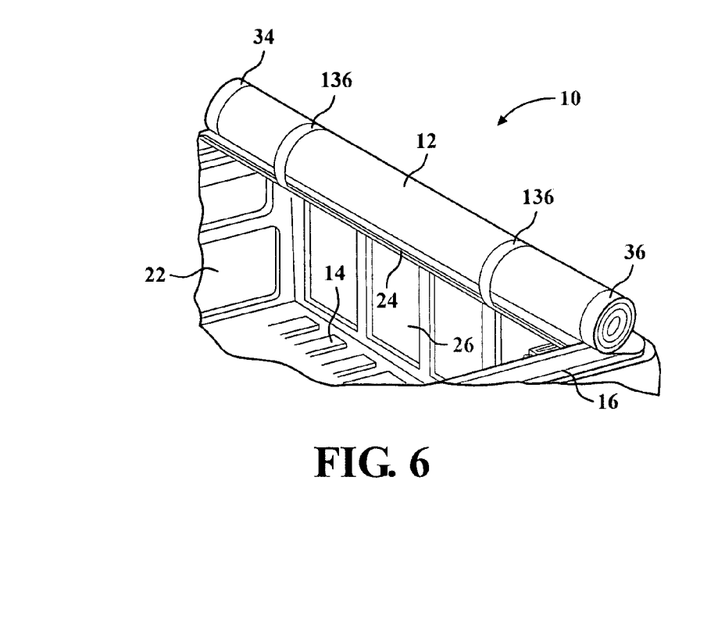
FIG. 6 is a second perspective view of a tonneau cover in a stowed position and connected to the truck bed of a vehicle, according to the present invention.

The tonneau cover 12 is also permanently connected to a rear rail 30, the rear rail 30 selectively connects to each of the side rails 16,18 through the use of rear connectors, or pivot mounts 32. The tonneau cover 12 is made of a flexible material which is able to fold, and is also able to be rolled up as shown in FIGS. 2, 3, and 6. More specifically, the tonneau cover 12 is movable between an installed, or deployed position, to a stowed position. The tonneau cover 12 includes a first pocket 34 and a second pocket 36, each pocket has a first end 38 which is in proximity to the front rail 24 and a second end 40 which is in proximity to the rear rail 30. Each of the pockets 34,36 extends along the sides of the tonneau cover 12, almost the entire length of the tonneau cover 12. Extending through each of the pockets 34,36 are cables 42,44; a first cable 42 extending through the first pocket 34, and a second cable 44 extending through the second pocket 36. A first end 46 of the first cable 42 extends out of the first end 38 of the first pocket 34, and a second end 48 of the first cable 42 extends out of the second end 40 of the first pocket 34. Additionally, the first end 46 of the second cable 44 extends out of the first end 38 of the second pocket 36, and the second end 48 of the second cable 44 extends out of the second end 40 of the second pocket 36.

Figure 9:
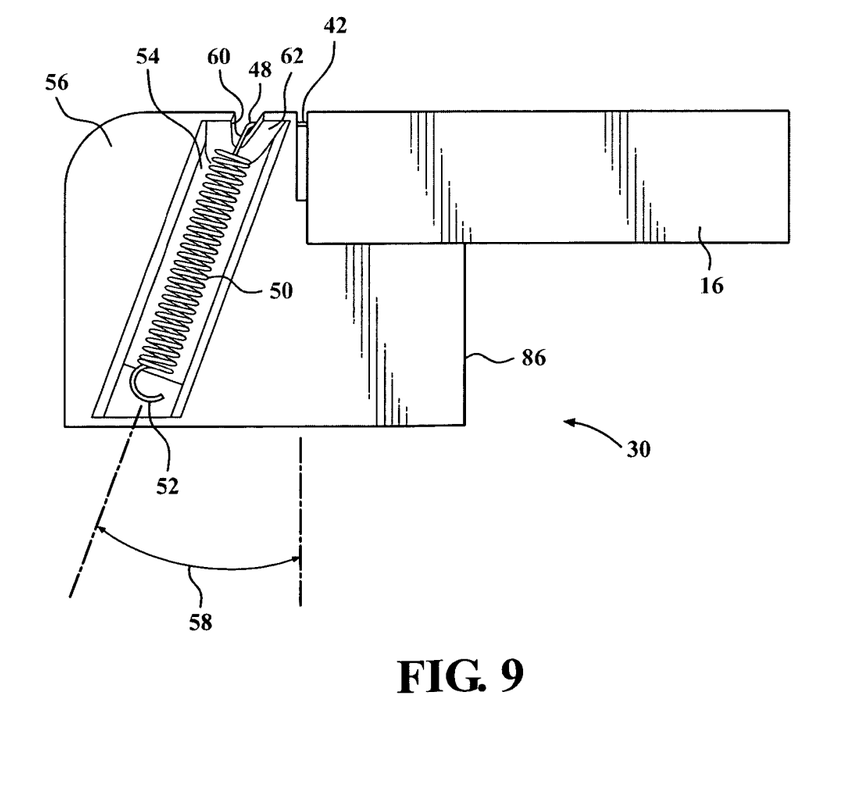
FIG. 9 is a bottom view of a portion of a side rail and a portion of a rear rail used for a tonneau cover according to the present invention.

Reference in the description is now made to the function of the first cable 42 and first pocket 34, as well as the first side rail 16, however, the description also applies to the second cable 44, the second pocket 36, and the second side rail 18 since they are substantially symmetrical. The first end 46 of the cable 42 is connected to the front rail 24, and connected to the second end 48 of the cable 42 is a tensioning member, such as a spring 50. More specifically, the spring 50 is connected to the end 48 of the cable 42 that extends out of the pocket 34 toward the rear rail 30. The spring 50 is connected to the rear rail 30 through the use of a hook 52 formed as part of the spring 50 and a latch (not shown) formed as part of the rear rail 30. The spring 50 is disposed in a channel 54 formed as part of a base portion 56 of the rear rail 30, and is located at an angle 58 relative to the side rail 16 as shown in FIG. 9. As mentioned above, the spring 50 is connected to the second end 48 of the cable 42, and the cable 42 extends through a notch 60 formed in a wall portion 62, and the wall portion 62 is formed as part of the base portion 56 in proximity to the channel 54. While the spring 50 is shown to be a helical spring, other types of tensioning members or devices may be utilized to provide tensioning of the cable 42.

Figure 7:
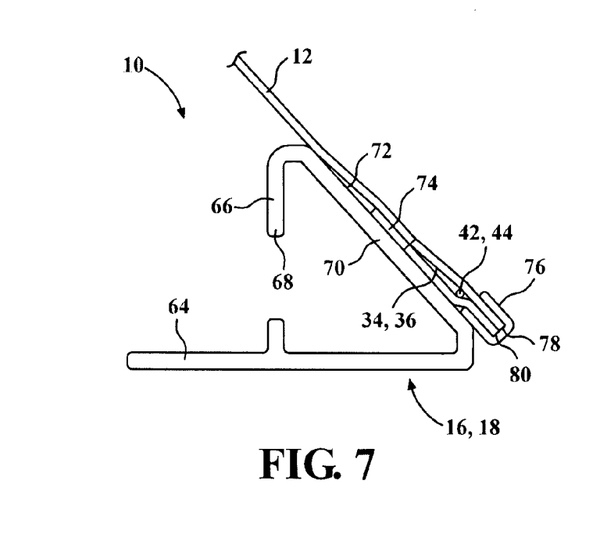
FIG. 7 is a sectional side view of a side rail and a tonneau cover in a deployed position, according to the present invention.
Figure 14:
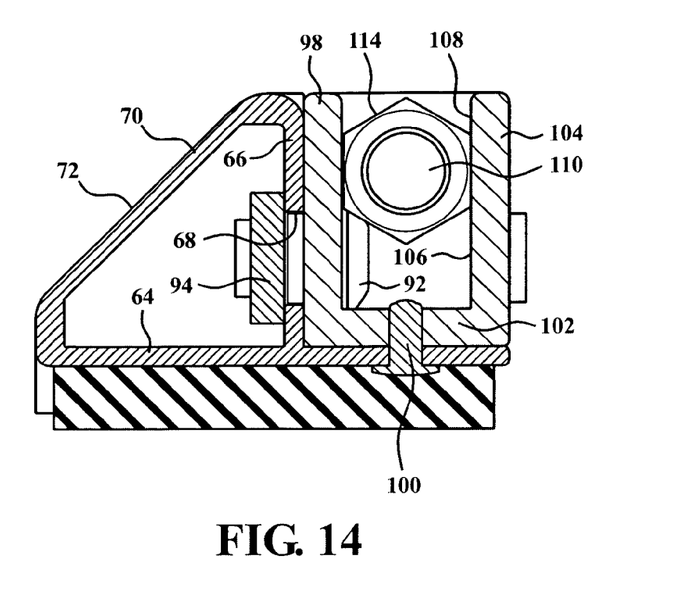
FIG. 14 is a sectional view taken along lines 14-14 of FIG. 10, according to the present invention.
Figure 15A:
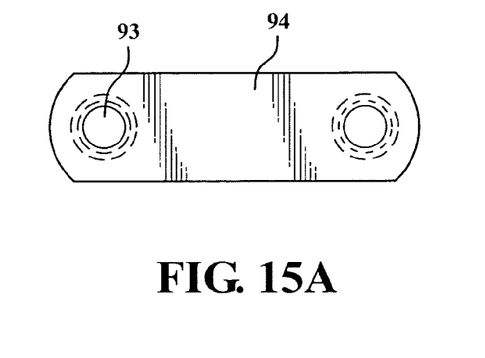
FIG. 15A is a front view of a back plate used for a connector of a tonneau cover, according to the present invention.
Figure 15B:
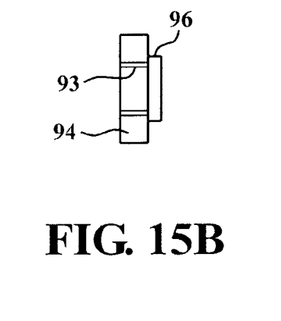
FIG. 15B is a side view of a back plate used for a connector of a tonneau cover, according to the present invention.
Figure 16A:
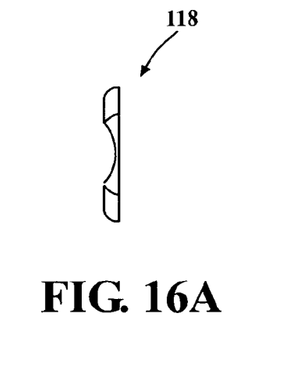
FIG. 16A is a side view of a washer used for a connector of a tonneau cover, according to the present invention.
Figure 16B:
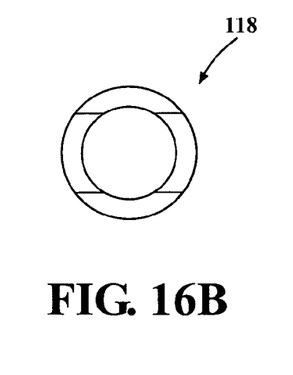
FIG. 16B is a front view of a washer used for a connector of a tonneau cover, according to the present invention.
Figure 17A:
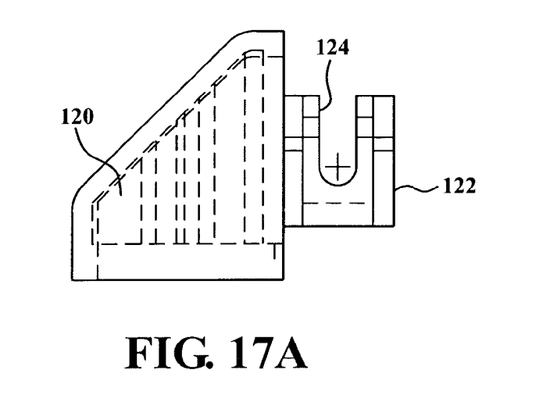
FIG. 17A is a side view of a side rail mount used for connection with the rear of a side rail for a tonneau cover, according to the present invention.
Figure 17B:
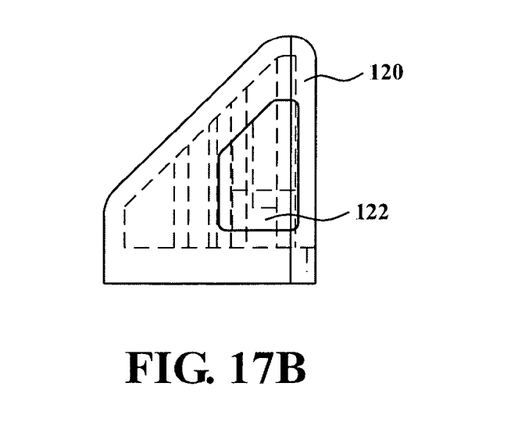
FIG. 17B is a front view of a side rail mount used for connection with the rear of a side rail for a tonneau cover, according to the present invention.
Figure 17C:
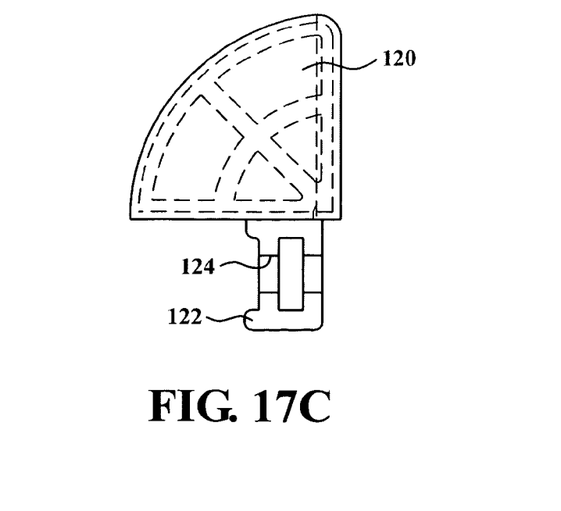
FIG. 17C is a top view of a side rail mount used for connection with the rear of a side rail for a tonneau cover, according to the present invention.
Figure 18A:
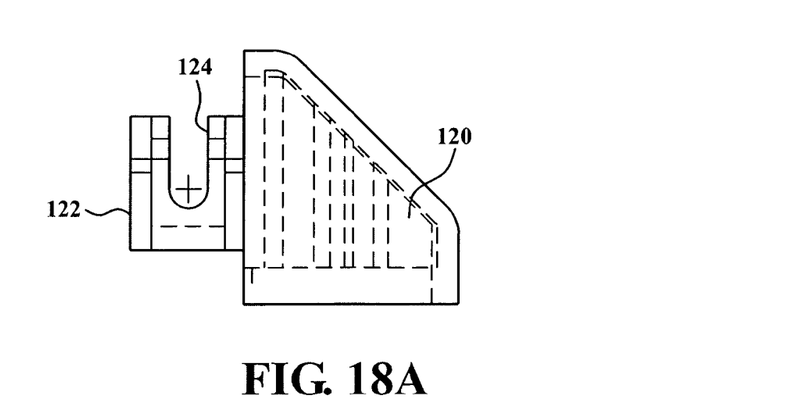
FIG. 18A is a side view of a side rail mount used for connection with the front of a side rail for a tonneau cover, according to the present invention.
Figure 18B:
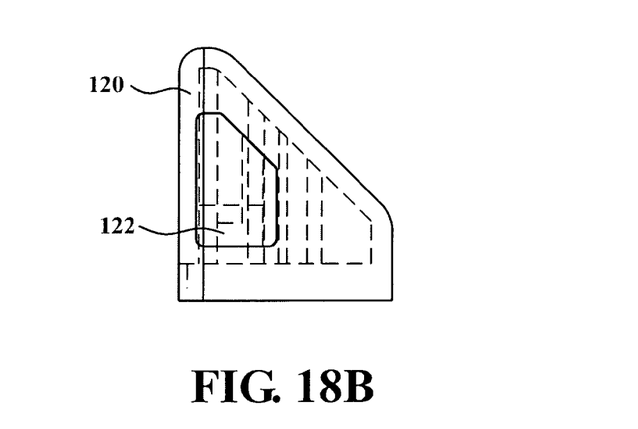
FIG. 18B is a front view of a side rail mount used for connection with the front of a side rail for a tonneau cover, according to the present invention.
Figure 18C:
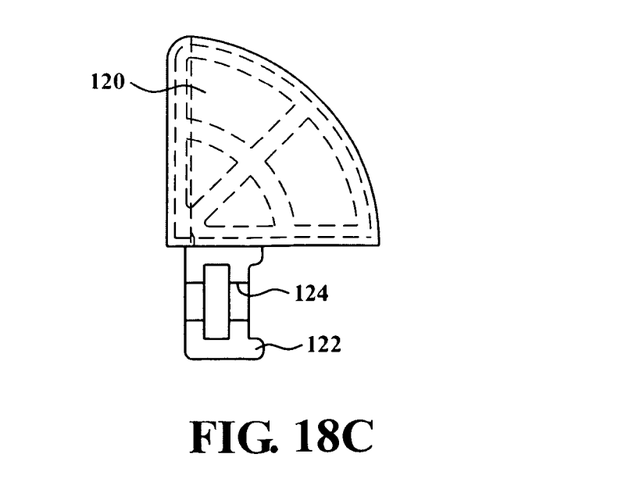
FIG. 18C is a top view of a side rail mount used for connection with the front of a side rail for a tonneau cover, according to the present invention.

The side rail 16 has a substantially triangular-shaped cross-section, best seen in FIGS. 7 and 14, and includes a base 64, which is substantially horizontal, as well as a side wall 66, which is substantially vertical and has an elongated aperture 68 which extends substantially the length of the rail 16. The rail 16 also includes an angled wall portion 70 having an outer angled surface 72. A portion of the tonneau cover 12 rests on the outer angled surface 72 when the tonneau cover 12 is in the deployed position, as shown in FIG. 7. The tonneau cover 12 includes a strip of material, or fabric 74 (preferably made of the same material as the remaining portion of the tonneau cover 12), which extends along the length of the side of the tonneau cover 12 to form the pocket 34. The strip of fabric 74 is sewn to the tonneau cover 12 in this embodiment, but it is within the scope of the invention that the strip of fabric 74 may be connected to the tonneau cover 12 using other methods. There is also an outer clip 76 which surrounds an outer edge 78 of the tonneau cover 12 and an outer edge 80 of the strip of fabric 74. The outer clip 76 has substantially U-shaped cross-section, and extends along the length of the pocket 34 and clamps the edges 78,80 together. However, while the outer clip 76 is shown, it is within the scope of the invention that other types of clips may be used, as long as they are flexible to allow the tonneau cover 12 to be placed in the stowed position shown in FIGS. 2, 3, and 6.

The rear rail 30 is selectively connected to the rear connectors 32. The rear connectors 32 include a recess 82 formed as part of a base 84. The recess 82 of each connector 32 is capable of receiving a pivot rail 86 formed as part of the rear rail 30. The recess 82 is substantially rounded, and corresponds to the shape of the pivot rail 86. The pivot rail 86 is also shorter in height in relation to the base portion 56, but the base portion 56 is substantially the same height as the side rail 18 to provide a smoother looking, more aesthetically pleasing appearance when the tonneau cover 12 is in the deployed position.

The connectors 28,32 also include a set of access apertures 88 and a set of through-apertures 90, and a set of fasteners 92 are inserted into and through the apertures 88 and into the through-apertures 90, through another set of threaded apertures 93 formed as part of a backing plate 94. The backing plate 94 includes a shoulder portion 96 which is received by the elongated aperture 68. The shoulder portion 96 prevents the backing plate 94, and therefore the connectors 28,32, from becoming displaced vertically relative to the side rails 16,18. To connect the connectors 28,32 to the side rails 16,18, the fasteners 92 are inserted through the through apertures 90 and the threaded apertures 93 formed as part of the backing plate 94 and are tightened, thereby applying pressure to an outer side wall 98 of the connectors 28,32, and the side wall 66 of the side rail 16,18, securing the connectors 28,32 to the rails 16,18. To further secure the connectors 28,32 to the rails 16,18, a rivet 100 is inserted through the base 64 and a bottom wall 102 of the side rails 16,18, best shown in FIG. 14. The fasteners 92 are accessible for removal by extending a screwdriver, or the like, through the apertures 88.

The outer side wall 98 and the bottom wall 102 of the connectors 28,32 along with an inner side wall 104 form a channel 106, which is accessible through a transverse aperture 108. There is an adjuster screw 110 which extends through the transverse aperture 108 and extends through a spacer 112. The spacer 112 is also disposed in the transverse aperture 108 as well as an adjuster nut 114. The adjuster screw 110 also extends through a pair of adjustment apertures 116, through the spacer 112, a washer 118, and through the adjuster nut 114 as shown in the Figures. The adjuster screw 110 is partially threaded, and the threaded portion of the adjuster screw 110 is received by the adjuster nut 114, which is also threaded. The adjuster nut 114 is prevented from rotating in the channel 106 because the sides of the adjuster nut 114 are in contact with the walls 98,104, as shown in FIG. 14.

Attached to each end of the side rails 16,18 are side rail mounts 120, each of which includes an extension 122 having a recess 124. Each extension 122 is received into an end of the side rails 16,18 as shown in the Figures, such that the recess 124 is exposed in the elongated aperture 68, and a portion of the front rail 24 is disposed between the side rail mounts 120 and the front connector 28. Each extension 122 also receives a screw 126 in the recess 124, and when the screw 126 is tightened, the side rail mounts 120 are then secured to the side rails 16,18.

Figure 10:
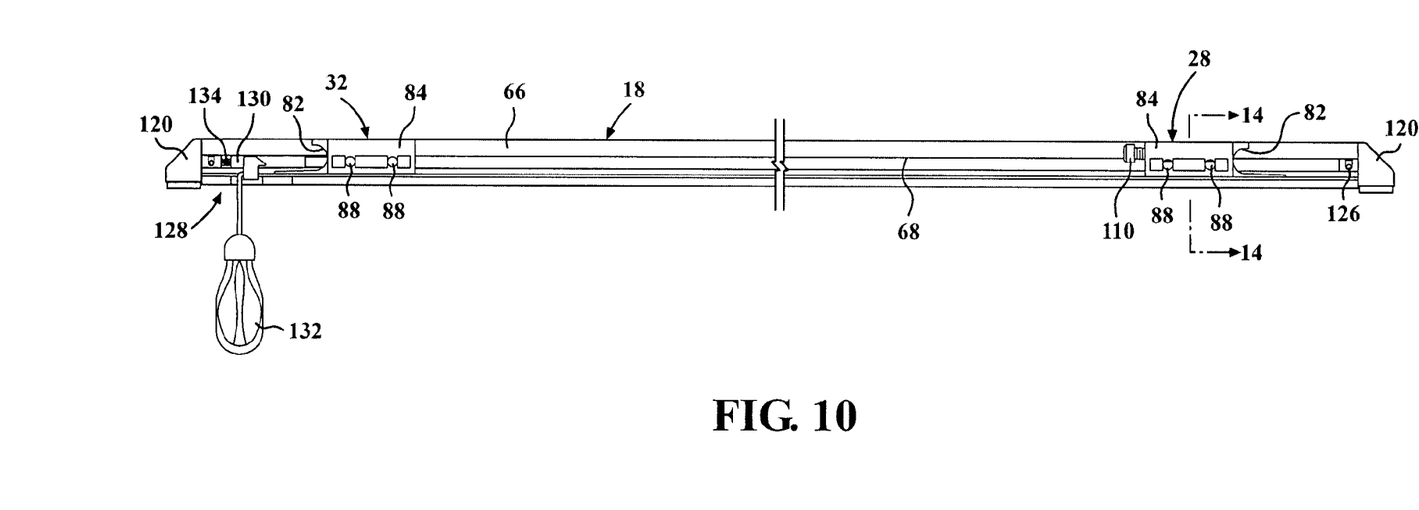
FIG. 10 is a side view of a side rail used for a tonneau cover according to the present invention.
Figure 11:
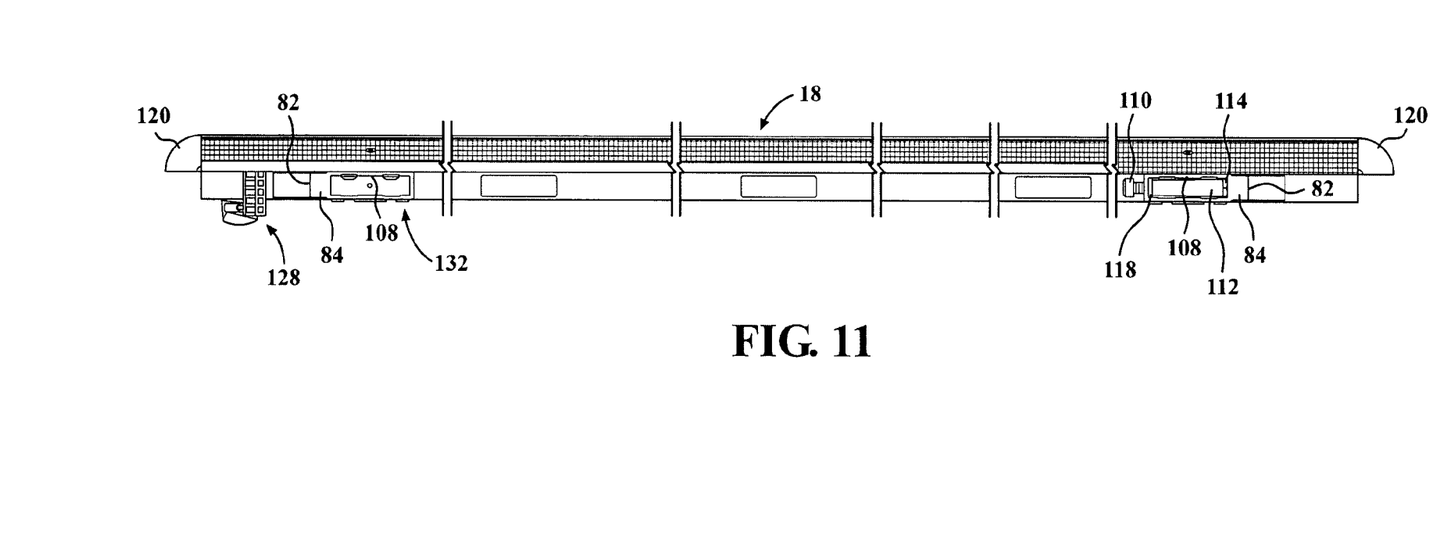
FIG. 11 is a top view of a side rail used for a tonneau cover according to the present invention.
Figure 12A:
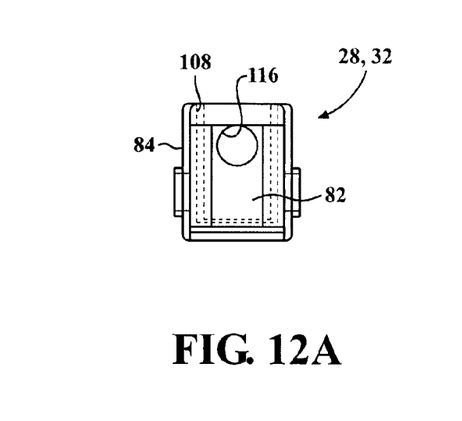
FIG. 12A is a front view of a connector used for a tonneau cover according to the present invention.
Figure 12B:
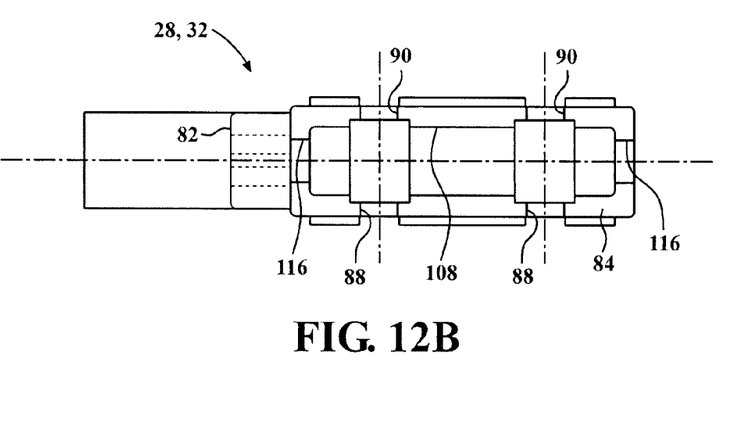
FIG. 12B is a top view of a connector used for a tonneau cover according to the present invention.
Figure 12C:
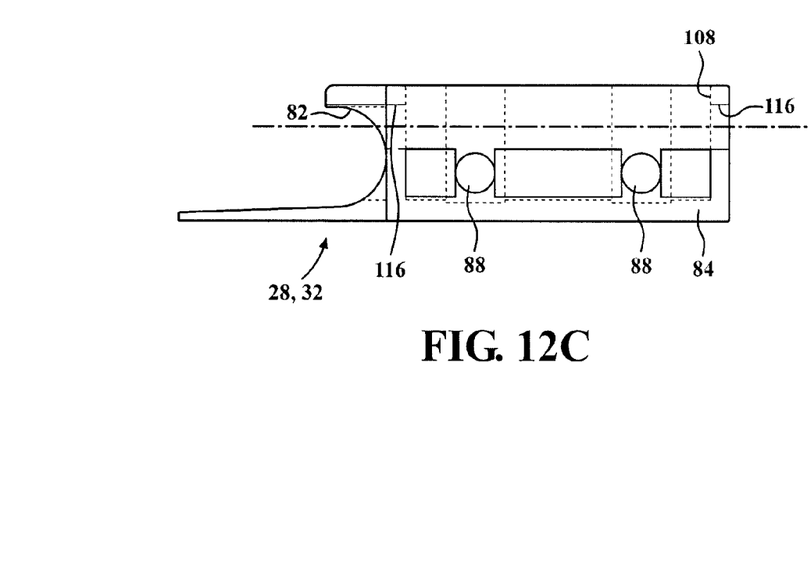
FIG. 12C is a side view of a connector used for a tonneau cover according to the present invention.
Figure 13:
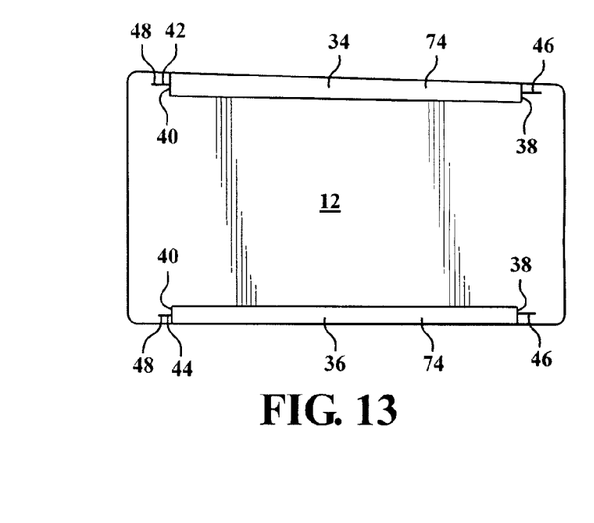
FIG. 13 is a bottom view of a tonneau cover removed from a truck bed, according to the present invention.

Referring now to FIGS. 10 and 11, the rear connector 32 associated with the second side rail 18 also includes a release mechanism, generally shown at 128. The release mechanism 128 includes latch 130, a handle 132, and a spring 134. The spring 134 is disposed between the extension 122 of the side rail mount 120 connected to the rear of the second side rail 18, and biases the latch 130 forward, the function of which will be described later.

Figure 4:
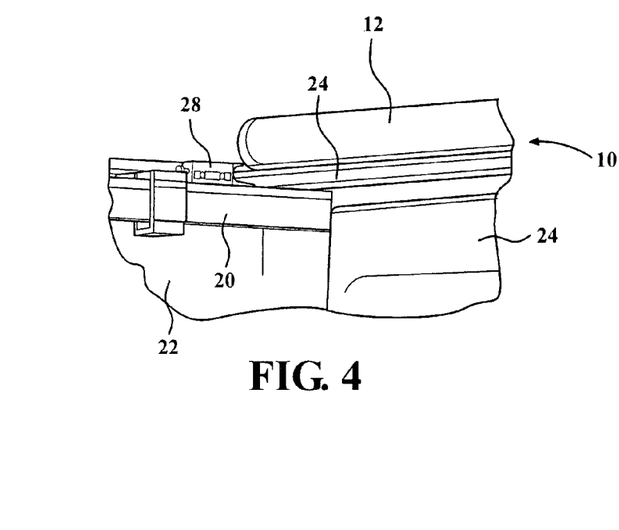
FIG. 4 is first a perspective view of a tonneau cover in a stowed position and connected to the truck bed of a vehicle, according to the present invention.
Figure 5A:
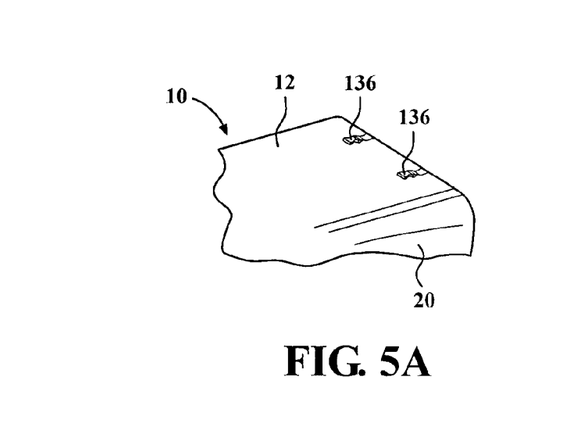
FIG. 5A is a first perspective view of a tonneau cover in a deployed position, according to the present invention.
Figure 5B:
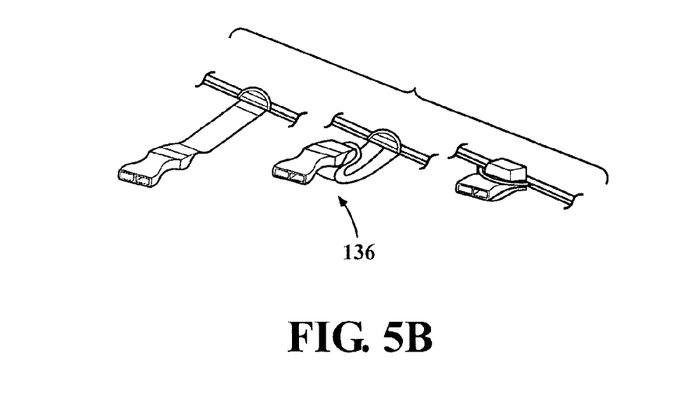
FIG. 5B is a perspective view of various positions of a tie-down strap used for maintaining a tonneau cover in a stowed position, according to the present invention.

The tonneau cover 12 is first assembled to the front connectors 28. The front rail 24 also includes a pivot rail 86 (which is similar to the pivot rail 86 of the rear rail 30) which is received into the recess 82 of the front connectors 28; the front rail 24 is then pivoted about the pivot rail 86 such that the front rail 24 is on top of the front wall 26, and disposed substantially between the side rails 16,18 as shown in FIGS. 4, 5A, and 6. The side rail mounts 120 are then connected to the side rails 16,18 as described above, securing the front rail 24 to the side rails 16,18.

Figure 8:
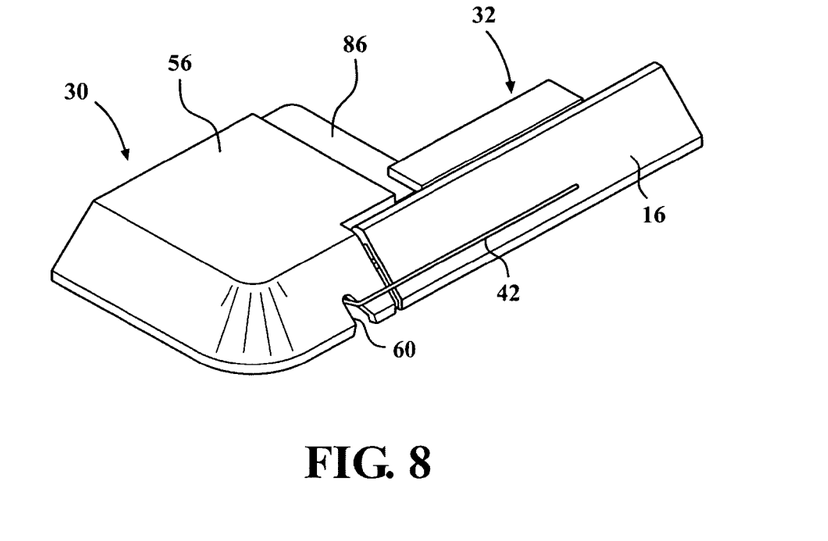
FIG. 8 is an enlarged perspective view of a portion of a side rail and a portion of a rear rail used for a tonneau cover according to the present invention.
Figure 19:
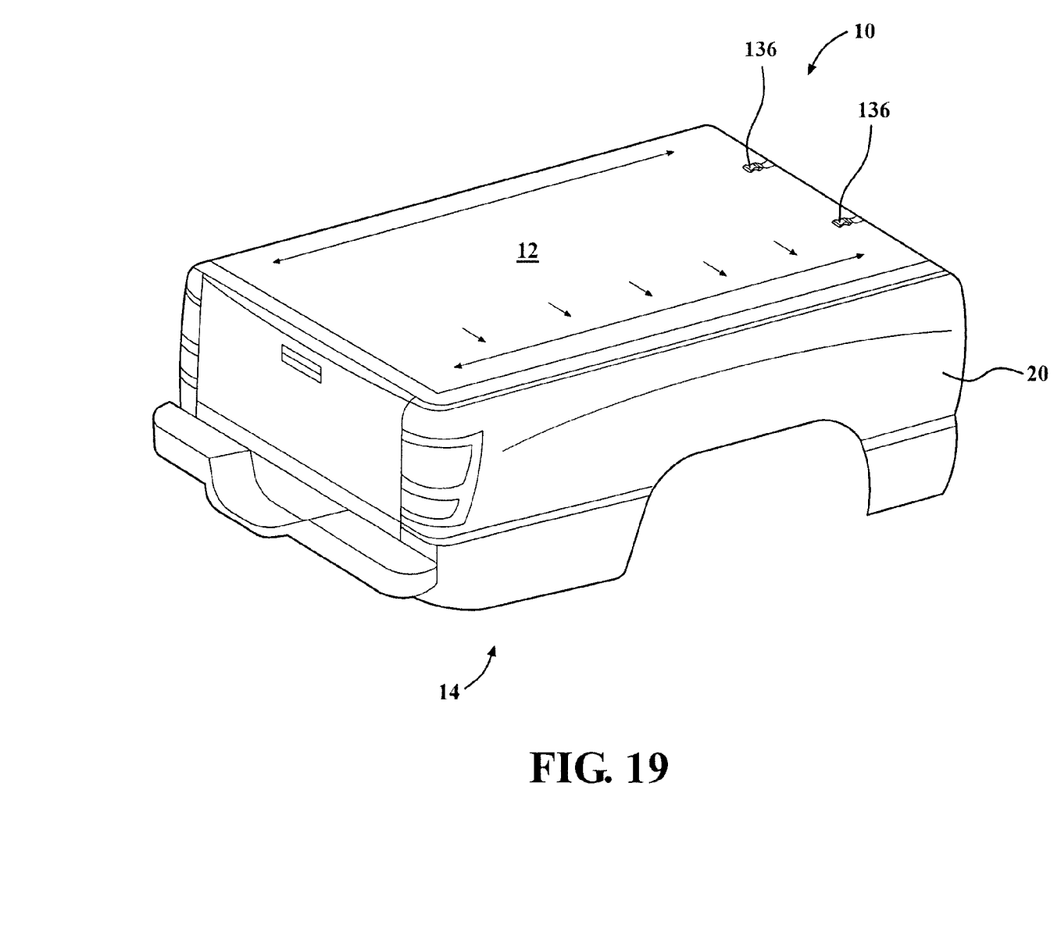
FIG. 19 is a perspective view of a pickup bed having a tonneau cover in a deployed position, according to the present invention.

The tonneau cover 12 is maintained in the stowed position by a plurality of tie-down straps 136. To change the tonneau cover 12 to the deployed position, the straps 136 are released, and the cover 12 is rolled toward the rear of the bed 14 as shown in FIGS. 5A and 19. Once the cover 12 is rolled out, best shown in FIGS. 5A, 8-9, and 19, the rear rail 30 is then connected to the rear connectors 32. The pivot rail 86 of the rear rail 30 is first inserted into the recess 82 (shown in FIG. 10) of the rear connectors 32, and the rear rail 30 is then rotated about the pivot rail 86 until the rear rail 30 is in the position shown in FIGS. 8-9. As this occurs, pressure is applied to the rear rail 30 to cause the release mechanism 128 to lock the rear rail 30 into position. As the rear rail 30 is placed in the position shown in FIGS. 8 and 9, the tension is increased in the cables 42,44 such that the cables 42,44 position the outer edges of the tonneau cover 12 across the outer angled surface 72 of the side rails 16,18. The cables 42,44 are of a length that when in the deployed position, the springs 50 apply tension to the cables 42,44, thereby creating tension in the tonneau cover 12 and ensuring the tonneau cover 12 fits properly in relation to the side rails 16,18, the front rail 24, and the rear rail 30. More specifically, the cables 42,44 provide the proper cross-car tension in the tonneau cover 12.

To change the tonneau cover 12 to the stowed position as shown in FIGS. 2-3 and 6, thereby allowing access to the bed 14, the handle 132 is simply pulled to move the latch 130 against the force of the spring 134, thereby releasing the rear rail 30 from the release mechanism 128. The release mechanism 128, latch 130, handle 132, and spring 134 are best seen in FIGS. 10-12C. This allows the tonneau cover 12 to be rolled up as shown in FIGS. 2-3 and 6. The tonneau cover 12 is maintained in the stowed position by the tie down straps 136, if desired.

The present invention has the advantage that the springs 50 maintain the proper tension on the tonneau cover 12 over the life of the tonneau cover 12, even as the tonneau cover 12 is exposed to various temperatures and weather conditions or may become worn. The springs 50 also maintain the edges of the tonneau cover 12 in contact with the outer angled surface 72 of the side rails 16,18 when the tonneau cover 12 is in the deployed position, preventing moisture, dirt, and other debris from entering the bed 14. Additionally, because the tension in the cables 42,44 is automatically generated by the springs 50 and the edges of the tonneau cover 12 are automatically properly positioned onto the outer angled surfaces 72 of the side rails 16,18, the additional step of attaching the cover 12 to the side rails 16,18 (as with previous designs) is eliminated, reducing the time needed to change the cover between the stowed position and the deployed position.

The description of the invention is merely exemplary in nature and, thus, variations that do not depart from the essence of the invention are intended to be within the scope of the invention. Such variations are not to be regarded as a departure from the spirit and scope of the invention.

What is claimed is:
1. A tonneau cover for a vehicle that is movable between a stowed position and a deployed position, comprising:
    a tonneau cover selectively movable between a stowed position and a deployed position;
    at least one pocket extending along a side of said tonneau cover; and at least one cable disposed in said at least one pocket such that a first end of said at least one cable extends out of a first end of said at least one pocket, and a second end of said at least one cable extends out of a second end of said at least one pocket such that when said tonneau cover is in said deployed position and said first end of said cable and said second end of said cable are secured to a portion of said vehicle, said at least one cable is adapted for applying tension to said tonneau cover;

a front rail, said tonneau cover connected to said front rail, said at least one cable connected to said front rail;

a rear rail, said tonneau cover connected to said rear rail, said at least one cable connected to said rear rail;

a first side rail connected to a bed of a vehicle; and a second side rail connected to said bed of said vehicle, wherein said front rail is connected to said first side rail and said second side rail when said tonneau cover is in either of said stowed position or said deployed position, and when said tonneau cover is in said deployed position, said rear rail is connected to said first side rail and said second side rail such that tension is applied to said tonneau cover by said at least one cable.

2. The tonneau cover for a vehicle that is movable between a stowed position and a deployed position of claim 1, further comprising:

said at least one pocket further comprising a first pocket and a second pocket; and said at least one cable further comprising a first cable disposed in said first pocket, and a second cable disposed in said second pocket, said first cable connected to said front rail and said rear rail, and said second cable connected to said front rail and said rear rail such that when said tonneau cover is in said deployed position, said first cable and said second cable apply tension to said tonneau cover.

3. The tonneau cover for a vehicle that is movable between a stowed position and a deployed position of claim 1, each of said first side rail and said second side rail further comprising:

a base;

a substantially vertical side wall connected to said base;

an outer angled surface connected to said base and said substantially vertical side wall;

a front connector connected to said base and said substantially vertical side wall for connection with said front rail, securing the position of said front rail relative to said first side rail and said second side rail; and a rear connector connected to said base and said substantially vertical side wall for connection with said rear rail, securing the position of said rear rail relative to said first side rail and said second side rail.

4. The tonneau cover for a vehicle that is movable between a stowed position and a deployed position of claim 1, said rear rail further comprising:

at least one channel formed as part of said rear rail;

a spring disposed in said channel and connected to said rear rail; and at least one wall portion having at least one notch, said at least one cable extending through said at least one notch and connecting to said spring such that when said tonneau cover is in said deployed position, said spring applies tension to said at least one cable, thereby applying tension to said tonneau cover.

5. The tonneau cover for a vehicle that is movable between a stowed position and a deployed position of claim 1, said at least one pocket further comprising:

a strip of material extending along an outer edge of said tonneau cover such that said at least one cable is located between said tonneau cover and said strip of material; and an outer clip which clamps an outer edge of said tonneau cover and an outer edge of said strip of material, securing said outer edge of said tonneau cover and said outer edge of said strip of material together.

6. A tonneau cover for a vehicle that is movable between a stowed position and a deployed position, comprising:

a tonneau cover moveable between a stowed position and a deployed position;

a first pocket formed as part of said tonneau cover, said first pocket having a first end and a second end;

a first cable disposed in said first pocket, said first cable having a first end extending out of said first end of said first pocket, and said first cable having a second end extending out of said second end of said first pocket;

a second pocket formed as part of said tonneau cover, said second pocket having a first end and a second end; and a second cable disposed in said first pocket, said second cable having a first end extending out of said first end of said second pocket, and said second cable having a second end extending out of said second end of said second pocket, such that when said tonneau cover is in said deployed position and said first end of said first cable is connected to said vehicle, said second end of said first cable is connected to said vehicle, said first end of said second cable is connected to said vehicle, and said second end of said second cable is connected to said vehicle, said first cable and said second cable apply a tension to said tonneau cover, maintaining a predetermined amount of tension in said tonneau cover;

a first side rail connected to the bed of vehicle;

a second side rail connected to the bed of a vehicle;

a front rail connected to and disposed between a portion of said first side rail and a portion of said second side rail, said tonneau cover being connected to said front rail such that said first end of said first cable is connected to said front rail and said first end of said second cable is connected to said front rail; and a rear rail connected to and disposed between a portion of said first side rail and a portion of said second side rail when said tonneau cover is in said deployed position, said tonneau cover being connected to said rear rail such that said second end of said first cable is connected to said rear rail and said second end of said second cable is connected to said rear rail, and when said tonneau cover is in said deployed position, the positioning of said rear rail generates a tension in said first cable and said second cable, generating a tension in said tonneau cover.

7. The tonneau cover for a vehicle that is movable between a stowed position and a deployed position of claim 6, said rear rail further comprising:

a plurality of channels;

a plurality of springs, one of said plurality of springs disposed in each of said plurality of channels, said second end of said first cable connected to another of said plurality of springs, and said second end of said second cable connected to one of said plurality of springs; and a plurality of wall portions, each of said plurality of wall portions having a notch, and each of said plurality of wall portions formed as part of said rear rail near a respective one of said plurality of channels such that said first cable extends through a notch of one of said plurality of wall portions to connect to one of said plurality of springs disposed in one of said plurality of channels, and said second cable extends through a notch of another of said plurality of wall portions to connect to another of said plurality of springs disposed in another of said plurality of channels;

wherein said one of said plurality of springs connected to said second end of said first cable and said another of said plurality of springs connected to said second end of said second cable apply tension to said first cable and said second cable when said tonneau cover is in said deployed position.

8. The tonneau cover for a vehicle that is movable between a stowed position and a deployed position of claim 6, each of said first side rail and said second side rail further comprising:

an outer angled surface, a portion of said tonneau cover is adjacent said outer angled surface when said tonneau cover is in said deployed position;

a base extending away from said outer angled surface;

a substantially vertical side wall connected to said outer angled surface and said base;

a front connector connected to said substantially vertical side wall and said base, said front connector having a recess such that a portion of said front rail is received into said recess of said front connector connected to said first side rail, and a portion of said front rail is disposed in said recess of said front connector connected to said second side rail; and a rear connector connected to said substantially vertical side wall and said base, said rear connector having a recess such that when said tonneau cover is in said deployed position, said rear rail is connected to said first side rail and said second side rail, and a portion of said rear rail is disposed in said recess of said rear connector connected to said first side rail, and a portion of said rear rail is disposed in said recess of said rear connector connected to said second side rail.

9. The tonneau cover for a vehicle that is movable between a stowed position and a deployed position of claim 6, each of said first pocket and said second pocket further comprising:

a strip of material extending along an outer edge of said tonneau cover such that one of said first cable or said second cable is located between said tonneau cover and said strip of material; and an outer clip which clamps an outer edge of said tonneau cover and an outer edge of said strip of material, securing said outer edge of said tonneau cover and said outer edge of said strip of material together.

10. A tonneau cover for a vehicle that is movable between a stowed position and a deployed position, comprising:

a tonneau cover selectively moveable between a stowed position and a deployed position;

a first pocket extending along one side of said tonneau cover, said first pocket having a first end and a second end;

a first cable extending through said first pocket, said first cable having a first end extending out of said first end of said first pocket, and said first cable having a second end extending out of said second end of said first pocket;

a second pocket extending along another side of said tonneau cover, said second pocket having a first end and a second end;

a second cable extending through said first pocket, said second cable having a first end extending out of said first end of said second pocket, and said second cable having a second end extending out of said second end of said second pocket;

a front rail, said tonneau cover connected to said front rail, said first end of said first cable connected to said front rail, and said first end of said second cable connected to said front rail;

a rear rail, said tonneau cover connected to said rear rail, said second end of said first cable connected to said rear rail, and said second end of said second cable connected to said rear rail;

a first side rail connected to said front rail, said first side rail connected to said rear rail when said tonneau cover is in said deployed position; and a second side rail connected to said front rail, said second side rail connected to said rear rail when said tonneau cover is in said deployed position;

wherein said first cable and said second cable apply tension to said tonneau cover when said rear rail is connected to said first side rail and said second side rail.

11. The tonneau cover for a vehicle that is movable between a stowed position and a deployed position of claim 10, each of said first side rail and said second side rail further comprising:

a base positioned upon a wall of a truck bed;

a substantially vertical side wall formed as part of said base;

an outer angled surface formed as part of said base and said substantially vertical side wall such that said base, said substantially vertical side wall, and said outer angled surface form a substantially triangular-shaped cross section;

a front connector connected to said base and said substantially vertical side wall, said front rail connected to said front connector through the use of a recess formed as part of said front connector; and a rear connector connected to said base and said substantially vertical side wall, said rear rail connected to said rear connector when said tonneau cover is in said deployed position through the use of a recess formed as part of said rear connector;

wherein a portion of said tonneau cover is disposed on said outer angled surface when said tonneau cover is in said deployed position.

12. The tonneau cover for a vehicle that is movable between a stowed position and a deployed position of claim 10, said rear rail further comprising:

a plurality of channels, one of said plurality of channels formed as part of said rear rail in proximity to said first side rail, and another of said plurality of channels formed as part of said rear rail in proximity to said second side rail;

a plurality of springs, one of said plurality of springs connected to said first cable and disposed in said one of said plurality of channels formed as part of said rear rail in proximity to said first side rail, and another of said plurality of springs connected to said second cable and disposed in said another of said plurality of channels formed as part of said rear rail in proximity to said second side rail;

a plurality of wall portions, one of said plurality of wall portions formed as part of said rear rail in proximity to said one of said plurality of channels formed as part of said rear rail in proximity to said first side rail, and another of said plurality of wall portions formed as part of said rear rail in proximity to said one of said plurality of channels formed as part of said rear rail in proximity to said second side rail; and a plurality of notches, said first cable extending through one of said plurality of notches formed as part of said one of said plurality of wall portions formed as part of said rear rail in proximity to said one of said plurality of channels formed as part of said rear rail in proximity to said first side rail, and said second cable extending through another of said plurality of notches formed as part of said another of said plurality of wall portions formed as part of said rear rail in proximity to said one of said plurality of channels formed as part of said rear rail in proximity to said second side rail;

wherein said plurality of springs apply tension to said first cable and said second cable when said tonneau cover is in said deployed position, thereby applying tension to said tonneau cover.

13. The tonneau cover for a vehicle that is movable between a stowed position and a deployed position of claim 10, each of said first pocket and said second pocket further comprising:

a strip of material extending along an outer edge of said tonneau cover such that one of said first cable or said second cable is located between said tonneau cover and said strip of material; and an outer clip which clamps an outer edge of said tonneau cover and an outer edge of said strip of material, securing said outer edge of said tonneau cover and said outer edge of said strip of material together.

\* \* \* \* \*